United States Patent
Golofit et al.

(10) Patent No.: US 11,463,247 B2
(45) Date of Patent: Oct. 4, 2022

(54) GENERATOR OF PHYSICALLY UNCLONABLE CRYPTOGRAPHIC KEYS

(71) Applicant: POLITECHNIKA WARSZAWSKA, Warsaw (PL)

(72) Inventors: Krzysztof Golofit, Warsaw (PL); Piotr Wieczorek, Warsaw (PL)

(73) Assignee: POLITECHNIKA WARSZAWSKA, Warsaw (PL)

( * ) Notice: Subject to any disclaimer, the term of this patent is extended or adjusted under 35 U.S.C. 154(b) by 0 days.

(21) Appl. No.: 16/637,339

(22) PCT Filed: Aug. 7, 2018

(86) PCT No.: PCT/IB2018/055943
§ 371 (c)(1),
(2) Date: Feb. 7, 2020

(87) PCT Pub. No.: WO2019/030670
PCT Pub. Date: Feb. 14, 2019

(65) Prior Publication Data
US 2021/0385080 A1 Dec. 9, 2021

(30) Foreign Application Priority Data

Aug. 8, 2017 (PL) .......................................... 422486
Aug. 8, 2017 (PL) .......................................... 422487
May 17, 2018 (PL) .......................................... 425581

(51) Int. Cl.
*H04L 29/06* (2006.01)
*H04L 9/08* (2006.01)
(Continued)

(52) U.S. Cl.
CPC .............. *H04L 9/0866* (2013.01); *H04L 9/14* (2013.01); *H04L 9/3278* (2013.01); *H04L 2209/12* (2013.01)

(58) Field of Classification Search
CPC .... H04L 9/0866; H04L 2209/12; H03K 3/031
See application file for complete search history.

(56) References Cited

U.S. PATENT DOCUMENTS 6,177,812 B1 * 1/2001 Nagao ................. H03D 13/004
327/7
9,444,618 B1 9/2016 Trimberger et al.
(Continued)

FOREIGN PATENT DOCUMENTS

WO 0161854 A1 8/2001

OTHER PUBLICATIONS

Implementation of pseudo-linear feedback shift register-based physical unclonable functions on silicon and sufficient Challenge-Response pair acquisition using Built-In Self-Test before shipping (Year: 2020).*

(Continued)

*Primary Examiner* — Tri M Tran
(74) *Attorney, Agent, or Firm* — Browdy and Neimark, PLLC (57) ABSTRACT

Generator of physically unclonable cryptographic keys (PUF) has two adjustable speed ring oscillators (GPRS, GPRS'), which outputs (o-GPRS, o-GPRS') are connected to inputs (i1-DF, i2-DF) of a phase detector (DF), which output (o-DF) is connected to control inputs of the adjustable speed ring oscillators (s-GPRS, s-GPRS') through a control system (US) and is also connected to a output (o-PUF) of the generator of physically unclonable cryptographic keys (PUF) through a sample and compare circuit (URP). Generator has a initializing input (i-UCH) connected to both initializing inputs of the adjustable speed ring oscillators (i-GPRS, GPRS') and to the first input of the sample and compare circuit (i-URP), which second input (z-URP) is (Continued)

connected to the output (o-GPRS') of one of adjustable speed ring oscillators (GPRS').

20 Claims, 6 Drawing Sheets

(51) Int. Cl.
*H04L 9/14* (2006.01)
*H04L 9/32* (2006.01)

(56) References Cited

U.S. PATENT DOCUMENTS

| | | | |
|---|---|---|---|
| 2009/0121797 A1* | 5/2009 | Karabatsos | H03K 3/0315 331/57 |
| 2009/0222502 A1 | 9/2009 | Ikegami et al. | |
| 2011/0128081 A1 | 6/2011 | Hars | |
| 2011/0169580 A1 | 7/2011 | Dodrill | |
| 2014/0350305 A1* | 11/2014 | Becker | B01J 19/006 568/454 |

OTHER PUBLICATIONS

Phase Calibrated Ring Oscillator PUF Design and Application (Year: 2017).*

Wieczorek P. et al., "True Random Number Generator Based on Flip-Flop Resolve Time Instability Boosted by Random Chaotic Source", IEEE Transactions on Circuits and Systems I: Regular Papers: pp. 1279-1292, vol. 65, No. 4 (Apr. 2018).

Xiao-Feng Z. et al., "True Random Number Generator for Network Security Co-processor" Retrieved from the Internet:,URL:www.ecice06.com%2FEN%2Farticle%2FdownloadArticleFile.do%3FattachType%3DPDF%26id%3D9768&usg=AOvVaw3FMmq5ZTTgsjTQZudjtEkV>; [retrieved on Nov. 14, 2018].

Yin et al. "Temperature-aware cooperative ring oscillator PUF." 2009 IEEE International Workshop on Hardware-Oriented Security and Trust. IEEE, (2009).

Krzysztof Golofit et al., "Chaos-Based Physical Unclonable Functions", Appl. Sci. 2019, 9, 991, pp. 1-17.

"Chaos Theory", en.wikipedia.org/Wiki/Chaos_theory, last edited May 10, 2022.

* cited by examiner

GENERATOR OF PHYSICALLY UNCLONABLE CRYPTOGRAPHIC KEYS

The invention concerns a generator of physically unclonable cryptographic keys especially keys that are physically obfuscated, unclonable and unique.

Generator of physically unclonable cryptographic keys (or physically unclonable functions) generates unpredictable sequences of random numbers, but what is crucial, the sequences have to be repeatable for one specimen. It is important to guarantee that the technological dispersion in electronic systems leads to such inter-class differences, that make it impossible to generate the same sequence by two different specimens, even when they were made in the same way and in the same technological process. Such generated random, but recurrent sequences of numbers can be used as cryptographic keys, e.g. for encryption or authorization.

There are known in the art, e.g. from the patent applications of inventions US2011169580 or WO0161854, random number generators, comprising ring oscillators, than cannot be used for generation of physically unclonable cryptographic keys, because they do not generate repeated sequences of numbers within particular specimens.

In the state of the art, from the article by Chi-En Yin, Gang Qu, "Temperature-aware cooperative ring oscillator PUF", 2009 IEEE International Workshop on Hardware-Oriented Security and Trust (HOST '09), Francisco, Calif., USA, 2009, pp. 36-42, DOI: 10.1109/HST.2009.5225055, there is known a generator of physically unclonable cryptographic keys, which comprises ring oscillators, which outputs are connected to two counters through multiplexers. Outputs of the counters are connected to a comparator, which output is an output of the generator of physically unclonable cryptographic keys.

The aim of the invention is to magnify the inter-class spread—technological dispersion of parameters of elements and delay paths resulting in different inter-class operation.

Generator of physically unclonable cryptographic keys comprising at least two ring oscillators, according to the invention comprises at least one phase detector, having inputs connected to respective outputs of the ring oscillators. Further at least one of the ring oscillators is an adjustable speed ring oscillator. Output of the phase detector is connected to at least one control input of the at least one adjustable speed ring oscillator and also to an output of the generator of physically unclonable cryptographic keys. The effect of such a construction is that the generator is a chaotic circuit, in which occurs the magnification of effects of the technological spread of the elements and connections contributing to the initial conditions.

Advantageously at least one of the ring oscillators has an initializing input connected to an input of the generator of physically unclonable cryptographic keys. This allows for multiple easy restarts of the circuit chaotic operation process.

Advantageously the output of the phase detector is connected to at least one control input of the at least one adjustable speed ring oscillator through a control system. The use of the control system allows to make changes of a feedback signal and in result improvement of the chaotic circuit performance.

Advantageously the output of the phase detector is connected to the output of the generator of physically unclonable cryptographic keys through a sample and compare circuit. As an example this circuit allows to ignore unusual and accidental strings that make it difficult to generate a cryptographic key.

Advantageously the sample and compare circuit has at least one input connected to the input of the generator of physically unclonable cryptographic keys. Such connection makes it easier to detect a starting moment of the system.

Advantageously the sample and compare circuit has at least one input connected to at least one of the outputs of the ring oscillators. Such connection allows to synchronize the sample and compare circuit with the chaotic circuit.

Advantageously at least one ring oscillator comprises at least one delay line, having an output connected to the output of the ring oscillator. Further the output of the delay line is also connected to its input through an initialization switch, wherein a control input of the initialization switch is connected to the initializing input of the ring oscillator, wherein the delay line comprises a chain of delays.

Advantageously at least one adjustable speed ring oscillator comprises at least one delay line comprising a chain of delays, having an output connected to the output of the adjustable speed ring oscillator and also connected through an initialization switch to an input of the delay line, wherein the control input of the initialization switch is connected to the initializing input of the adjustable speed ring oscillator.

Advantageously at least one adjustable speed ring oscillator comprises at least one additional delay subcircuit, connected to the delay line, to an output of a delay, through a switch, having a control input connected to the control input of the adjustable speed ring oscillator. Such a solution allows to adjust the frequency of the adjustable speed ring oscillator, and thus to regulate the phase relative to another oscillator.

Advantageously at least one adjustable speed ring oscillator comprises at least one controlled delay subcircuit connected in series into the delay line between an output of one delay and an input of the next delay in chain, wherein a control input of the controlled delay subcircuit is connected to the control input of the adjustable speed ring oscillator. Such a solution allows to adjust the frequency of the adjustable speed ring oscillator, and thus to regulate the phase relative to another oscillator.

Advantageously the controlled delay subcircuit comprises at least two field effect transistors of the opposite channel type, having drains and sources paired together, wherein one of the pairs is connected to an input of the controlled delay subcircuit, other pair is connected to an output of the controlled delay subcircuit, and a control input of the controlled delay subcircuit is connected to gates of both field effect transistors. Such a solution allows to differentiate the delays caused by the controlled delay subcircuit at a very low cost, since the transistors with the opposite channel type turn on at opposite logic states at their gates.

Advantageously in the field effect transistors the ratio of the length and width of the channel of one transistor is higher than the ratio of the length and width of the channel of the other transistor. This solution ensures the control of delays caused by the controlled delay subcircuit by defining the geometry of transistor channels.

Advantageously at least one delay is connected in series with at least one of the field effect transistors. This solution provides an additional delay time in the path of chosen transistor.

Advantageously at least one inverter is connected between the gates of the field effect transistors and the control input of the controlled delay subcircuit. Such a solution provides the opposite operation of transistors controlled by the same signal, resulting in the opposite frequency change in two complementary adjustable speed ring oscillator.

Advantageously at least one adjustable speed ring oscillator is a switchable chain ring oscillator. Such a solution allows to adjust the frequency of the adjustable speed ring oscillator, and thus to regulate the phase relative to another oscillator.

Advantageously at least one switchable chain ring oscillator comprises at least two delay lines connected with each other so that an output of the first delay line is connected to an input of the second delay line, and an output of one of the delay lines is connected to the output of the switchable chain ring oscillator, wherein delay lines comprise chains of delays.

Advantageously at least one switchable chain ring oscillator comprises a multiplexer, having a control input connected to the control input of the switchable chain ring oscillator. Further an output of the multiplexer is connected to the input of one of the delay lines through an initialization switch, having a control input connected to the initializing input of the switchable chain ring oscillator. Further inputs of the multiplexer are respectively connected to an input and an output of the other delay line.

Advantageously at least one control system comprises at least one delay, wherein delays are connected in chain.

Advantageously at least one phase detector consists of a flip-flop with two inputs being the inputs of the phase detector and an output being the output of the phase detector.

Advantageously at least one phase detector comprises two flip-flops each having two inputs and two outputs, wherein the inputs of the flip-flops are connected to inputs of the phase detector, and outputs of the flip-flops are connected to outputs of the phase detector. Further the first input of the phase detector is connected to both the first input of the first flip-flop and the second input of the second flip-flop. Further the second input of the phase detector is connected to both the second input of the first flip-flop and the first input of the second flip-flop. Further the output of the phase detector is connected to chosen outputs of the flip-flops through a logic circuit.

The invention has been described below in detail, with reference to the attached figures.

Figure 1:
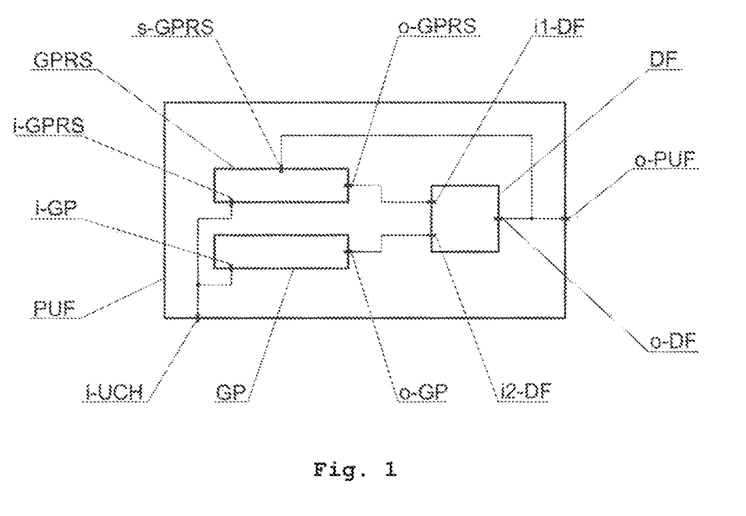
FIG. 1 presents a block diagram of generator of physically unclonable cryptographic keys with ring oscillator, adjustable speed ring oscillator and phase detector.

Generator of physically unclonable cryptographic keys presented in FIG. 1 comprises a ring oscillator GP and an adjustable speed ring oscillator GPRS, which outputs o-GP and o-GPRS are connected to inputs i1-DF and i2-DF of a phase detector DF. Output of the phase detector o-DF is connected to a control input of the adjustable speed ring oscillator s-GPRS. Output o-DF of the phase detector DF is connected to also to output o-PUF of the generator of physically unclonable cryptographic keys PUF. Initializing input i-UGH of the generator of physically unclonable cryptographic keys PUF is connected to both initializing inputs of the ring oscillator and the adjustable speed ring oscillator i-GP and i-GPRS.

Phase detector DF changes a frequency of the adjustable speed ring oscillator GPRS by iterative changes or synchronization of the phase of both oscillators GP and GPRS—which results in chaotic behavior of the circuit. Inter-class differences in the ring oscillators construction cause that the deterministic chaos becomes nondeterministic chaos, nevertheless to some degree specific for elements that the circuit was made of. As a result the sequences generated by a chaotic circuit provide uniqueness related to a device specimen. The connection of initializing inputs of the ring oscillator and the adjustable speed ring oscillator i-GP and i-GPRS to the initialization input i-UCH of the generator allows for simple and cyclic restarts of the circuit. In the case of the lack of such connections, the circuits would need to be restarted in another way—for example by cyclic turning on the power supply of the ring oscillator and the adjustable speed ring. oscillator.

Figure 2:
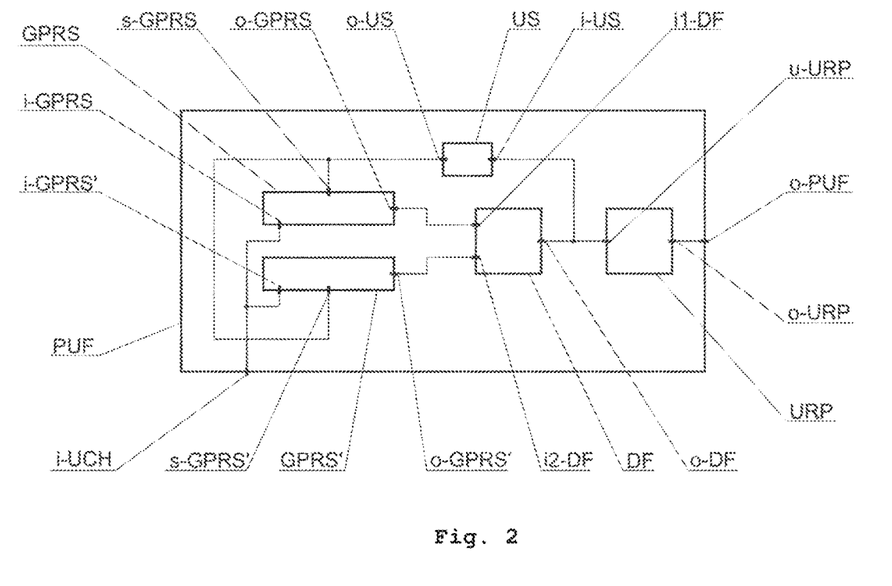
FIG. 2 presents a block diagram of generator of physically unclonable cryptographic keys with two adjustable speed ring oscillators, phase detector, control system and sample and compare circuit having one output.

Generator of physically unclonable cryptographic keys presented in FIG. 2 comprises two adjustable speed ring oscillators GPRS and GPRS', which outputs o-GPRS and o-GPRS' are connected to do inputs i1-DF and i2-DF of a phase detector DF. An output of the phase detector o-DF is connected to an input i-US of a control system US, and an output of the control system o-US is connected to control inputs of the adjustable speed ring oscillators s-GPRS and s-GPRS'. The output o-DF of the phase detector DF is also connected to do an input u-URP of a sample and compare circuit URP, and an output of this circuit o-URP is connected to an output o-PUF of the generator of physically unclonable cryptographic keys PUF. An initializing input i-UCH of the generator of physically unclonable cryptographic keys PUF is connected to both initializing inputs of the adjustable speed ring oscillators i-GPRS and i-GPRS'.

The chaotic circuit consists of the adjustable speed ring oscillators GPRS and GPRS', the phase detector DF as well as the control system US, which provide sensitivity to inter-class dispersion of electronic element parameters of which the circuit consists. Sample and compare circuit allows to collect streams and compare them with each other. Collecting subsequent streams generated by the chaotic circuit and comparing them with each other allows to determine the moment when the differences appear between the streams. The use of the second adjustable speed ring oscillator, operating in the opposite way to the first adjustable speed ring oscillator, improves the chaotic performance of the circuit. The connection of the initializing inputs of the adjustable speed ring oscillators i-GPRS and i-GPRS' to the initializing input i-UCH of the generator of physically unclonable cryptographic keys PUF enable multiple initialization and restarting of the adjustable speed ring oscillators GPRS and GPRS'.

Figure 3:
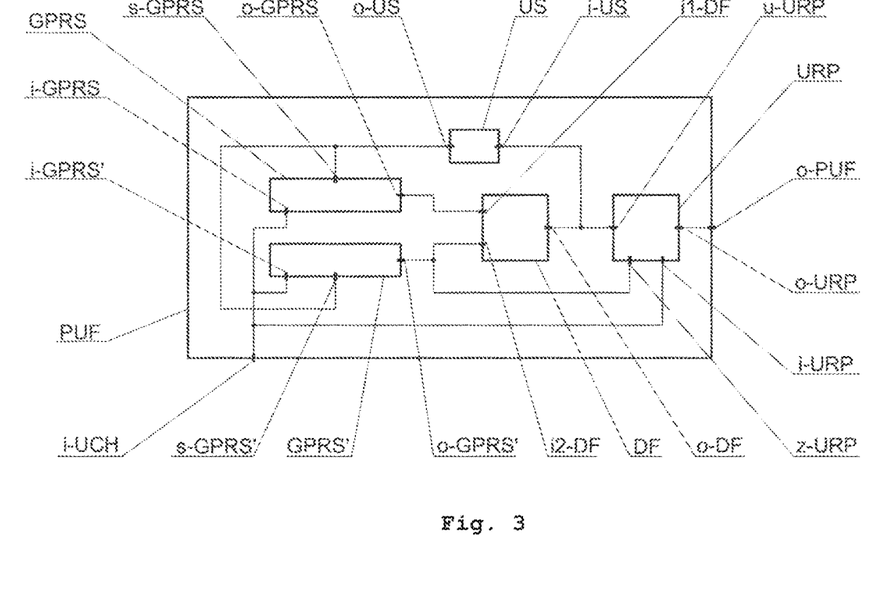
FIG. 3 presents a block diagram of generator of physically unclonable cryptographic keys with two adjustable speed ring oscillators, phase detector, control system and sample and compare circuit having three outputs.

Generator of physically unclonable cryptographic keys presented in FIG. 3 comprises two adjustable speed ring oscillators GPRS and GPRS', which outputs o-GPRS and o-GPRS' are connected to inputs i1-DF and i2-DF of a phase detector DF. An output of the phase detector o-DF is connected to an input i-US of the control system US, and an output of the control system o-US is connected to both control inputs of the adjustable speed ring oscillators s-GPRS and s-GPRS'. The output o-DF of the phase detector DF is also connected to do an input u-URP of the sample and compare circuit URP, and an output of this circuit o-URP is connected to an output o-PUF of the generator of physically unclonable cryptographic keys PUF. An input of the generator of physically unclonable cryptographic keys i-UCH is connected to both initializing inputs of the adjustable speed ring oscillators i-GPRS and i-GPRS' and also to second input of the sample and compare circuit i-URP. The third input of the sample and compare circuit z-URP is connected to the output of the second of the adjustable speed ring oscillators o-GPRS'.

The connections of the inputs i-URP and z-URP of the sample and compare circuit URP to the initializing input i-UCH of the generator of physically unclonable cryptographic keys UCH and to the output o-GPRS' of one of the adjustable speed ring oscillators GPRS' improve and simplify the sampling and mutual comparison of numerical sequences.

Figure 4:
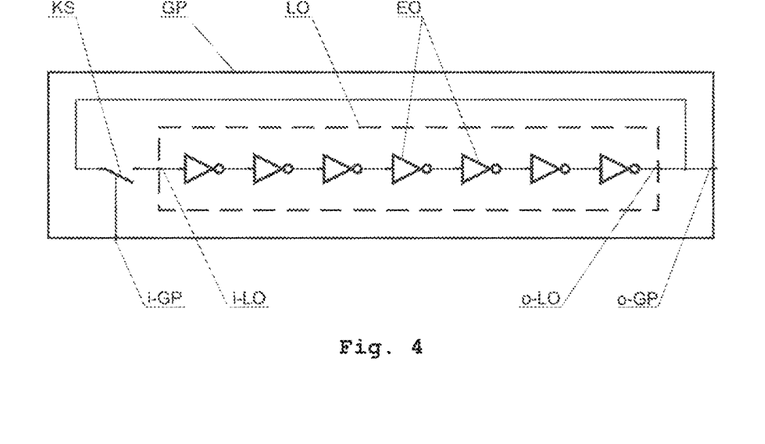
FIG. 4 presents a block diagram of a ring oscillator.

Ring oscillator presented in FIG. 4 comprises delay line LO, which output o-LO is connected to both an output o-GP of the ring oscillator GP and an input i-LO of the delay line LO through an initialization switch KS, which control input is connected to an initializing input i-GP of the ring oscillator GP. The delay line LO comprises delays EO connected in series.

The number of delay elements and a corresponding delay caused by each of these elements determines the basic operating frequency of the ring oscillator GP. The base frequency has a random component, resulting from physical phenomena as well as properties specific to a particular circuit. The initialization switch KS controlled with the initializing input i-GP of the ring oscillator GP allows to stop and restart the oscillator at any moment.

Figure 5:
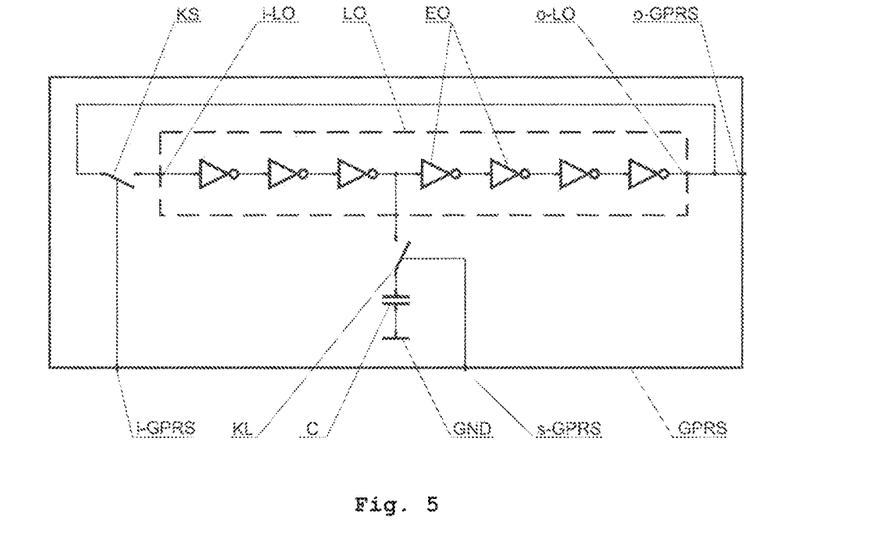
FIG. 5 presents a block diagram of first adjustable speed ring oscillator.

Adjustable speed ring oscillator presented in FIG. 5 comprises delay line LO, which output o-LO is connected to both an output o-GPRS of the adjustable speed ring oscillator GPRS and its input i-LO through an initialization switch KS, which control input is connected to an initializing input of the oscillator i-GPRS. The delay line LO comprises delays EO connected in series. Between chosen delays EO of the delay line LO an additional delay subcircuit in the form of a capacitor C is connected so, that one of the capacitor's pins is connected to the delay line through a switch KL. The other pin of the capacitor C is connected to the ground of the circuit GND. A control input of the switch KL is connected to a control input of the oscillator s-GPRS.

The oscillator GPRS has two basic operating frequencies and the selection of one of them is made by the oscillator control signal at the control input s-GPRS. The basic operating frequencies depend on the number of delays EO that the delay line LO consists of, on the delay caused by each delay EO, and on the additional delay resulting from connecting the capacitor causing the slower switching of adjacent delays. The basic frequencies have a random component, resulting from physical phenomena as well as properties specific to a particular circuit. The initialization switch KS controlled with the initializing input i-GPRS of the ring oscillator GPRS allows to stop and restart the oscillator at any time.

Figure 6:
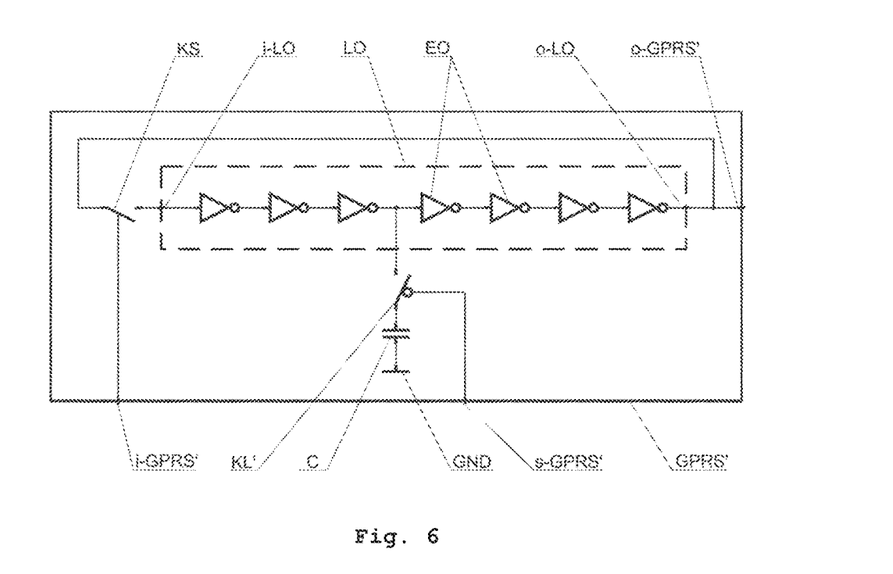
FIG. 6 presents a block diagram of second adjustable speed ring oscillator.

Adjustable speed ring oscillator presented in FIG. 6 has the same construction as the one presented in FIG. 5, with the difference that the KL' switch has the opposite effect to the KL switch. The opposite switch operation causes that the operating frequency of the GPRS' oscillator is different than the operating frequency of the GPRS oscillator.

Figure 7:
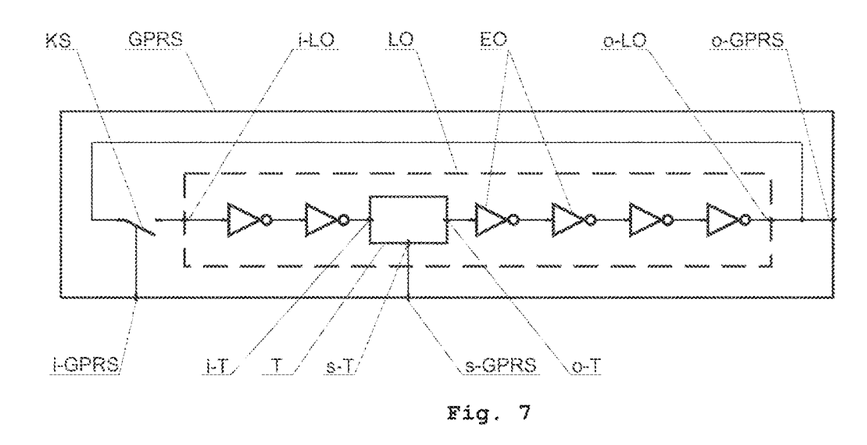
FIG. 7 presents a block diagram of third adjustable speed ring oscillator.

Adjustable speed ring oscillator presented in FIG. 7 comprises delay line LO, which output o-LO is connected to both an output o-GPRS of the adjustable speed ring oscillator GPRS and its input i-LO through an initialization switch KS, which control input is connected to an initializing input of the oscillator i-GPRS. The delay line LO comprises delays EO connected in series. Between chosen delays EO of the delay line LO a controlled delay subcircuit T is connected, which control input s-T is connected to a control input s-GPRS of the adjustable speed ring oscillator GPRS.

The oscillator GPRS has two basic operating frequencies and the selection of one of them is made by the oscillator control signal at the control input s-GPRS. The basic operating frequencies depend on the number of delays EO that the delay line LO consists of, on the delay caused by each delay EO, and one of two additional delays caused by the controlled delay subcircuit T. The additional delay is chosen by the logical control signal at the control input s-GPRS of the adjustable speed ring oscillator GPRS, and thus at the control input s-T of the controlled delay subcircuit T.

The initialization switch KS controlled with the initializing input i-GPRS of the ring oscillator GPRS allows to stop and restart the oscillator at any moment—especially it allows to start all the oscillators simultaneously. The binary streams at the output of the phase detector begin to differ after some number of samples, allowing to distinguish physical specimens containing identical implementations. This distinction is possible because of the technological dispersion in electronic systems.

Figure 8:
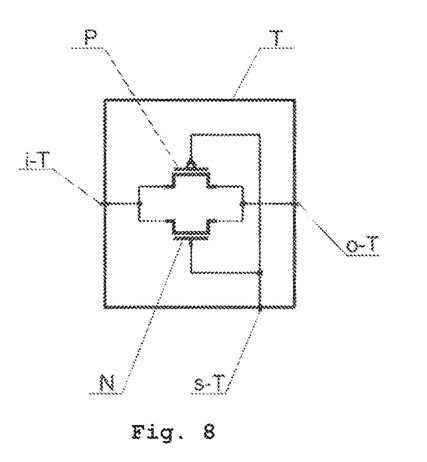
FIG. 8 presents a block diagram of a controlled delay subcircuit having two field effect transistors.

Controlled delay subcircuit presented in FIG. 8 comprises two field effect transistors of the opposite channel type P, N. The sources of the transistors are connected together and connected to an input i-T of the controlled delay subcircuit T, drains of the transistors are connected together and connected to an output o-T of the controlled delay subcircuit T, while gates of the transistors are connected together and connected to a control input s-T of the controlled delay subcircuit T.

The symmetry of the topology of the field effect transistor allows to replace its pins—a drain with a source. The opposite channel type of the field effect transistors controlled by the same logical signal at the transistors' gates, causes that logic zero disables one N-type transistor and turns on the other P-type, while the logic '1' does the opposite. The identical geometry of the transistors' channels results in that one of the P-type transistors causes slightly greater delay between an input i-T and an output o-T of the controlled delay subcircuit T. Changing the geometry of the transistor channels, in particular the significant elongation of one of the channels, introduces a highly asymmetric operation of the transistors in terms of their propagation delay. Reversing the length of channels in another pair of transistors, in another controlled delay subcircuit, connected in a series of delays of another adjustable speed ring oscillator, provides complementary control of the pair of such oscillators, in which the same control signal produces the opposite effect in each of them.

Figure 9:
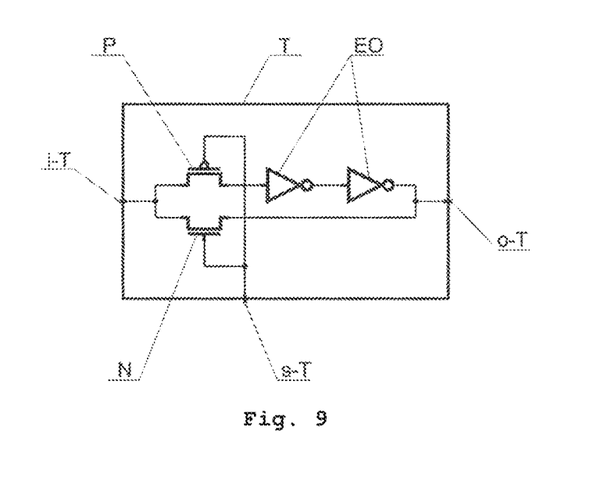
FIG. 9 presents a block diagram of a controlled delay subcircuit having two field effect transistors and additional delays connected in series with one of the field effect transistors.

Controlled delay subcircuit presented in FIG. 9 has the same construction as the one presented in FIG. 8, with the difference that in series with one of the transistors P, in particular between this transistor and the output o-T of the controlled delay subcircuit T, were connected two delays EO.

The presence of the two additional delays EO causes an additional propagation delay between the input i-T and the output o-T of the controlled delay subcircuit T, for a one particular logic level at s-T input. The same delay elements connected in series with the other transistor of another transistor pair of a controlled delay subcircuit, which was connected in series with delays of another adjustable speed ring oscillator, provide complementary control of the pair of such oscillators, in which the same control signal produces the opposite effect in each of them.

Figure 10:
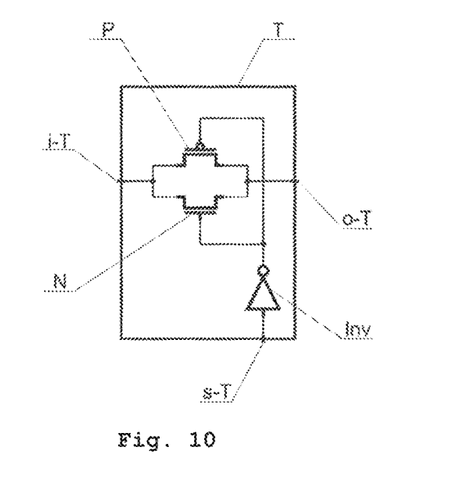
FIG. 10 presents a block diagram of a controlled delay subcircuit with inversion of the control signal.

Controlled delay subcircuit presented in FIG. 10 has the same construction as the one presented in FIG. 8, with the difference that an inverter Inv was connected between the gates of the field effect transistors P and N and the control input s-T of the controlled delay subcircuit T.

The use of the inverter Inv in only one of two controlled delay subcircuits, having identical internal structure, connected in series with delays of delay lines of two different adjustable speed ring oscillators, provides complementary control of the pair of such oscillators in which the same control signal gives the opposite effect in each of them.

Figure 11:
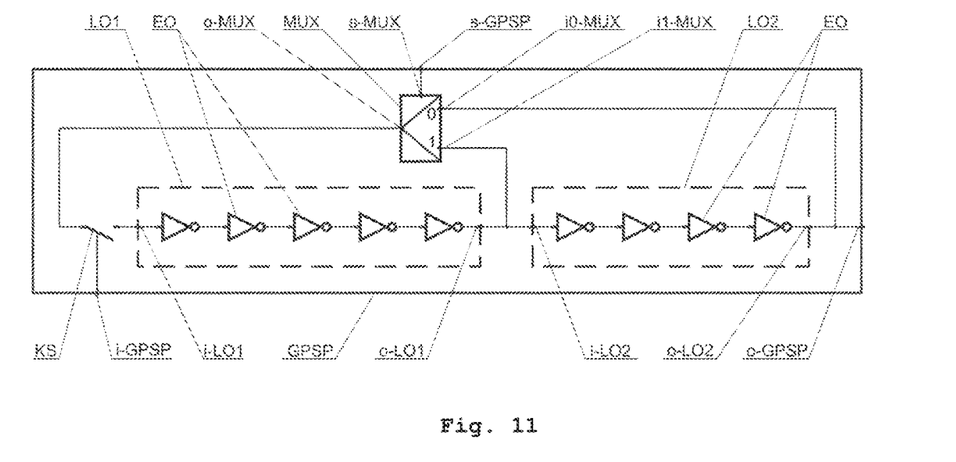
FIG. 11 presents a block diagram of first switchable chain ring oscillator.

Switchable chain ring oscillator presented in FIG. 11 comprises two delay lines LO1 and LO2 as well as a multiplexer MUX. The delay lines LO1 and LO2 are connected in series so, that an output of the first delay line o-LO1 is connected to an input of the second delay line i-LO2. An output of the second delay line o-LO2 is connected to an output o-GPSP of the switchable chain ring oscillator GPSP. Each of the delay lines LO1 and LO2 comprises delays EO connected in series. The multiplexer MUX has two inputs i0-MUX and i1-MUX, which are connected to the outputs of the delay lines o-LO1 and o-LO2. An output of the multiplexer o-MUX is connected to the input of the first delay line i-LO1 through an initialization switch KS, which control input is connected to an initializing input of the oscillator i-GPSP. A control input of the multiplexer s-MUX is connected to the control input of the oscillator s-GPSP.

The oscillator GPSP has two basic operating frequencies and the selection of one of them is made by the oscillator control signal at the control input s-GPSP. The basic operating frequencies depend on the number of delays EO that each of the delay lines LO1 and LO2 consists of, on the delay caused by each delay EO, and on the delay caused by the multiplexer MUX. The basic frequencies have a random component, resulting from physical phenomena as well as properties specific to a particular circuit. The initialization switch KS controlled with the initializing input i-GPSP of the ring oscillator GPSP allows to stop and restart the oscillator at any moment.

Figure 12:
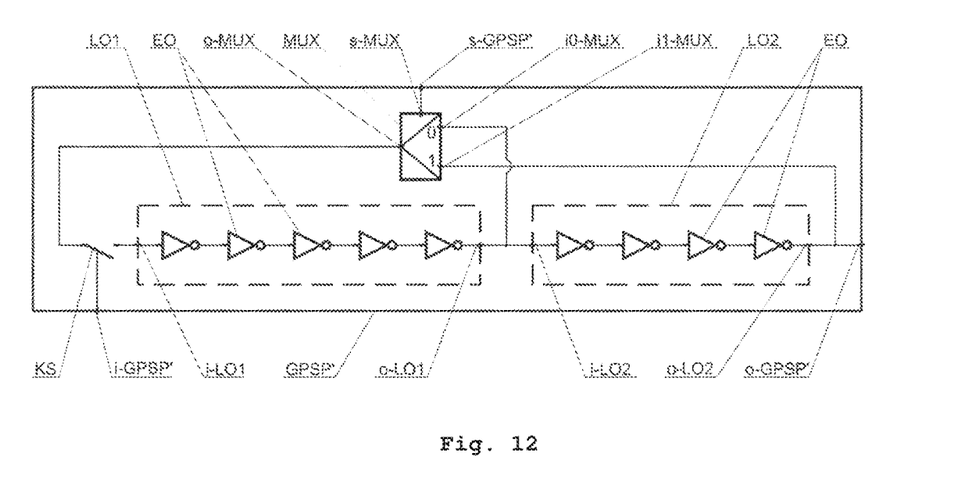
FIG. 12 presents a block diagram of second switchable chain ring oscillator.

Switchable chain ring oscillator presented in FIG. 12 has the same construction as the one presented in FIG. 11, with the difference that the inputs i0-MUX and i1-MUX of the multiplexer MUX are connected to do the outputs of the delay lines o-LO1 and o-LO2 in reverse order. The reverse connections of the outputs of the delay lines to the inputs of the multiplexer swap the selected operating frequency of the GPSP' oscillator and the frequency selected in the GPSP oscillator.

Figure 13:
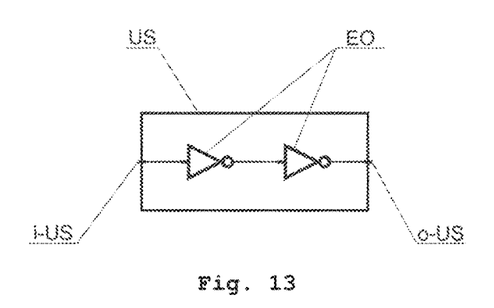
FIG. 13 presents a block diagram of a control system comprising delays.

Control system presented in FIG. 13 comprises a two-element series consisting of delays EO connected between an input i-US and an output o-US of a control system US.

The chain of EO delays introduces a delay in the circuit's feedback, i.e., a delay in transmitting the phase correction signal, thus it improves the chaotic properties of the system.

Figure 14:
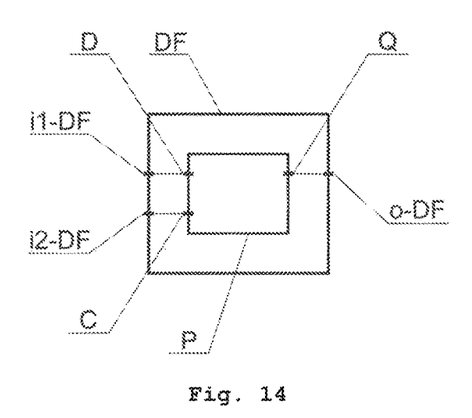
FIG. 14 presents a block diagram of a phase detector that consists of one flip-flop.

Phase detector presented in FIG. 14 consists of a flip-flop P having two inputs D and C being the inputs i1-DF and i2-DF of the phase detector DF, and an output Q being the output of the phase detector o-DF.

Depending on whether the rising edge on the D input of the flip-flop occurs before or after the rising edge on the C input of the flip-flop, the logic '1' or logic '0' will appear on the output Q. The type of the flip-flop—e.g., D flip-flop, RS flip-flop, JK flip-flop etc.—is of secondary importance, as long as the flip-flop detects which of the input signals slopes came first.

Figure 15:
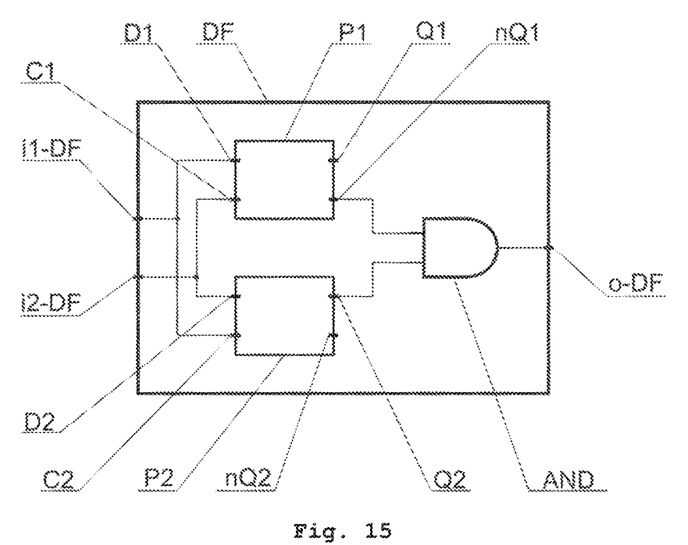
FIG. 15 presents block diagram of a phase detector comprising two flip-flops.

The phase detector presented in FIG. 15 comprises a logic circuit AND having two inputs and one output as well as two flip-flops P1 and P2, having two inputs D1, C1 and D2, C2 each as well as two outputs Q1, nQ1 and Q2, nQ2 each. The inputs of the flip-flops are connected to inputs of the phase detector DF, while the outputs of the flip-flops are connected to outputs of the phase detector through the logic circuit AND. The first input of the phase detector i1-DF is connected to both the first input of the first flip-flop D1 and the second input of the second flip-flop C2. The second input of the phase detector i2-DF is connected to both the second input of the first flip-flop C1 and the first input of the second flip-flop D2. The inputs of the logic circuit AND are connected to the second output of the first flip-flop nQ1 and the first output of the second flip-flop Q2. The output of the logic circuit AND is connected to the output of the phase detector o-DF.

The phase detector composed of two flip-flops provides symmetrical detection of negative and positive phase shifts.

The invention can be applied and used directly in chaotic circuits and phase correctors, and indirectly in generation of unclonable cryptographic keys that are unique for a particular device.

The invention claimed is:

1. A generator of physically unclonable cryptographic keys comprising at least two ring oscillators, comprising at least one phase detector, having an output and inputs connected to respective outputs of the ring oscillators, and wherein at least one of the ring oscillators is an adjustable speed ring oscillator, and an output of the phase detector is directly connected to at least one control input of the at least one adjustable speed ring oscillator and also to an output of the generator of physically unclonable cryptographic keys.

2. The generator of physically unclonable cryptographic keys according to claim 1, wherein at least one of the ring oscillators has an initializing input connected to an input of the generator of physically unclonable cryptographic keys.

3. The generator of physically unclonable cryptographic keys according to claim 1, wherein the output of the phase detector is connected to at least one control input of the at least one adjustable speed ring oscillator through a control system.

4. The generator of physically unclonable cryptographic keys according to claim 1, wherein the output of the phase detector is connected to the output of the generator of physically unclonable cryptographic keys through a sample and compare circuit.

5. The generator of physically unclonable cryptographic keys according to claim 4, wherein the sample and compare circuit has at least one input connected to an input of the generator of physically unclonable cryptographic keys.

6. The generator of physically unclonable cryptographic keys according to claim 4, wherein the sample and compare circuit has at least one input connected to at least one of the outputs of the ring oscillators.

7. The generator of physically unclonable cryptographic keys according to claim 4, wherein at least one ring oscillator comprises at least one delay line, having an output connected to the output of the ring oscillator, and in that the output of the delay line is also connected to an input of the delay line through an initialization switch, wherein a control input of the initialization switch is connected to an initializing input of the ring oscillator, and wherein the delay line comprises a chain of delays.

8. The generator of physically unclonable cryptographic keys according to claim 2, wherein at least one adjustable speed ring oscillator comprises at least one delay line comprising a chain of delays, having an output connected to an output of the adjustable speed ring oscillator and also connected through an initialization switch to an input of the delay line, wherein the control input of the initialization switch is connected to the initializing input of the adjustable speed ring oscillator.

9. The generator of physically unclonable cryptographic keys according to claim 8, wherein at least one adjustable speed ring oscillator comprises at least one additional delay subcircuit, connected to the delay line, to an output of a delay, through a switch, having a control input connected to the control input of the adjustable speed ring oscillator.

10. The generator of physically unclonable cryptographic keys according to claim 8, wherein at least one adjustable speed ring oscillator comprises at least one controlled delay subcircuit connected in series into the delay line between an output of one delay and an input of the next delay in chain, wherein a control input of the controlled delay subcircuit is connected to the control input of the adjustable speed ring oscillator.

11. The generator of physically unclonable cryptographic keys according to claim 10, wherein the controlled delay subcircuit comprises at least two field effect transistors of opposite channel type, having drains and sources paired together, wherein one of the pairs is connected to an input of the controlled delay subcircuit, other pair is connected to an output of the controlled delay subcircuit, and a control input of the controlled delay subcircuit is connected to gates of both field effect transistors.

12. The generator of physically unclonable cryptographic keys according to claim 11, wherein in the field effect transistors the ratio of the length and width of the channel of one transistor is higher than the ratio of the length and width of the channel of the other transistor.

13. The generator of physically unclonable cryptographic keys according to claim 11, wherein at least one delay is connected in series with at least one of the field effect transistors.

14. The generator of physically unclonable cryptographic keys according to claim 11, further comprising at least one inverter is connected between the gates of the field effect transistors and the control input of the controlled delay subcircuit.

15. The generator of physically unclonable cryptographic keys according to claim 1, wherein at least one adjustable speed ring oscillator is a switchable chain ring oscillator.

16. The generator of physically unclonable cryptographic keys according to claim 15, wherein the at least one switchable chain ring oscillator comprises at least two delay lines connected with each other so that an output of the first delay line is connected to an input of the second delay line, and an output of one of the delay lines is connected to the output of the switchable chain ring oscillator, wherein delay lines comprise chains of delays.

17. The generator of physically unclonable cryptographic keys according to claim 16, wherein the at least one switchable chain ring oscillator comprises a multiplexer, having a control input connected to the control input of the switchable chain ring oscillator, and an output of the multiplexer is connected to the input of one of the delay lines through an initialization switch, having a control input connected to the initializing input of the switchable chain ring oscillator, and inputs of the multiplexer are respectively connected to an input and an output of the other delay line.

18. The generator of physically unclonable cryptographic keys according to claim 3, wherein at least one control system comprises at least one delay, wherein delays are connected in chain.

19. The generator of physically unclonable cryptographic keys according to claim 1, wherein at least one phase detector consists of a flip-flop with two inputs being the inputs of the phase detector and an output being the output of the phase detector.

20. The generator of physically unclonable cryptographic keys according to claim 1, wherein at least one phase detector comprises two flip-flops each having two inputs and two outputs, wherein the inputs of the flip-flops are connected to inputs of the phase detector, and outputs of the flip-flops are connected to outputs of the phase detector and wherein, a first one of the inputs of the phase detector is connected to both a first one of the inputs of the first flip-flop and a second one of the inputs of the second flip-flop, a second one of the inputs of the phase detector is connected to both a second one of the inputs of the first flip-flop and a first one of the inputs of the second flip-flop, and the output of the phase detector is connected to chosen outputs of the flip-flops through a logic circuit.

* * * * *